United States Patent
Moon et al.

(10) Patent No.: US 10,583,750 B1
(45) Date of Patent: Mar. 10, 2020

(54) DEALERSHIP ENERGY MANAGEMENT SYSTEM FOR CHARGING INCOMING CUSTOMER VEHICLES WITH INVENTORY VEHICLES AND METHOD THEREOF

(71) Applicant: Honda Motor Co., Ltd., Tokyo (JP)

(72) Inventors: John Moon, San Jose, CA (US); Ryan D. Harty, Long Beach, CA (US); Jeremy Whaling, Carson, CA (US); Annika Elise Nordlund-Swenson, Kent, WA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/137,418

(22) Filed: Sep. 20, 2018

(51) Int. Cl.
*H02J 7/00* (2006.01)
*B60L 53/64* (2019.01)
*G06Q 10/06* (2012.01)

(52) U.S. Cl.
CPC ........ *B60L 53/64* (2019.02); *G06Q 10/06315* (2013.01)

(58) Field of Classification Search
CPC ... B60L 53/64; G06Q 10/06315; Y02T 90/14; Y02T 10/7005; Y02T 90/128; Y02T 10/7088; Y02T 90/163
See application file for complete search history.

(56) References Cited

U.S. PATENT DOCUMENTS

| | | | |
|---|---|---|---|
| 2011/0025267 A1* | 2/2011 | Kamen | B60L 8/003 320/109 |
| 2012/0277927 A1* | 11/2012 | Watkins | B60L 53/68 700/292 |
| 2018/0222340 A1 | 8/2018 | Zhao et al. | |

FOREIGN PATENT DOCUMENTS

| | | |
|---|---|---|
| CN | 103996078 A | 8/2014 |
| JP | 2010231258 A | 10/2010 |
| JP | 2015089819 A | 5/2015 |
| WO | 2018079970 A | 5/2018 |

* cited by examiner

*Primary Examiner* — Arun C Williams
(74) *Attorney, Agent, or Firm* — Honda Patents & Technologies North America, LLC; Aaron C. Fong

(57) ABSTRACT

In an illustrative embodiment, and to remove overall peak demand, a dealership energy management system may include bi-directional charging devices that may be associated with inventory vehicles and output devices that may be associated with customer vehicles. Inventory may be processed and associated with days stored at the dealership. The inventory vehicles may be charged up to 60% during off-peak hours to provide charge to incoming customer vehicles during peak hours. The inventory vehicles may discharge down to 40%, while providing charge to the customer vehicles, before another vehicle within the inventory is selected to provide charge. Inventory vehicles may be charged and discharged based on the days stored at the dealership as well as whether those vehicles have been discharged below a threshold.

16 Claims, 12 Drawing Sheets

DEALERSHIP ENERGY MANAGEMENT SYSTEM FOR CHARGING INCOMING CUSTOMER VEHICLES WITH INVENTORY VEHICLES AND METHOD THEREOF

BACKGROUND

Improving energy efficiency of a dealership may help reduce the costs associated with maintaining and using its building and may also help reduce the environmental impact of the building. Many utility companies may vary the cost of energy consumption during different times such that the cost of energy used by the dealership may change according to the time of day and/or year even if the amount of energy being used is relatively constant. During peak consumption hours versus off-peak consumption hours, the cost of energy may fluctuate considerably. Rates during weekends and off-peak hours may be much lower, while rates for electricity used during weekday peak hours (for example, 12:00 P.M.-6:00 P.M.) may be higher.

Traditional energy management systems used by the dealership may be inadequate in effectively managing cost and energy consumption with respect to varying energy costs within the building. For example, and in some instances, the dealership may offer free charging for a customer's electric vehicle while they search for new vehicles at the dealership. As customers almost always come in during peak times, however, the cost of energy to provide this service may be expensive and may drain valuable energy resources at the dealership.

The present disclosure provides for a dealership energy management system for charging incoming customer vehicles with inventory vehicles and method thereof that addresses the above-identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a dealership energy management system is provided. The system may include at least one bi-directional charging device associated with inventory vehicles, at least one output device associated with customer vehicles, at least one processor, and a memory operatively coupled to the processor, the memory storing program instructions that when executed by the processor, causes the processor to perform processes. The processes may include charging at least one inventory vehicle through the at least one bi-directional charging device during off-peak hours, determining whether at least one customer vehicle is connected to the at least one output device, and providing charge from the at least one inventory vehicle through the at least one bi-directional charging device to the at least one customer vehicle when the at least one customer vehicle is connected to the at least one output device.

In accordance with another aspect of the present disclosure, a method of charging incoming customer vehicles at a dealership with inventory vehicles is provided. The method may include receiving inventory vehicles and charging the inventory vehicles at the dealership during off-peak hours. In addition, the method may include determining whether at least one customer vehicle is connected. The method may also include providing charge from the inventory vehicles to the at least one customer vehicle when connected.

In accordance with yet another aspect of the present disclosure, a dealership energy management system is provided. The system may include at least one bi-directional charging device associated with at least one inventory vehicle. In addition, the system may include at least one output device associated with at least one customer vehicle. The system may also include a server charging the at least one inventory vehicle through the at least one bi-directional charging device during off-peak hours and providing the charge from the at least one inventory vehicle through the at least one bi-directional charging device to the at least one customer vehicle when the at least one customer vehicle is connected to the at least one output device.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, a dealership energy management system is presented that manages an additional power demand impact associated with customer electric vehicles that wish to charge at the dealership. In an illustrative embodiment, and to remove overall peak demand, the dealership energy management system may include bi-directional charging devices that may be associated with inventory vehicles and output devices that may be associated with the customer vehicles. Inventory may be processed and associated with days stored at the dealership. The inventory vehicles may be charged up to 60% during off-peak hours to provide charge to incoming customer vehicles during peak hours. The inventory vehicles may discharge to 40%, while providing charge to the customer vehicles, before another vehicle within the inventory is selected to provide charge. That is, the vehicle discharges to 40% before a load is shifted to other inventory vehicles. Inventory vehicles may be charged and discharged based on the days stored at the dealership as well as whether those vehicles have been discharged below a threshold. This may be based on anticipated customer vehicles coming in. Further details will be provided below.

Electric vehicle chargers may impart significant, short duration power demand events on the order of 40-100 kW, with the combination of Level 2 and DC Fast Chargers. Given the size and energy use patterns of dealerships, this additional power demand associated with electric vehicle charging may raise the dealerships' overall peak demand by 50% or more. Advantageously, the dealership energy management system described herein reduces this peak demand by using stored energy from inventory vehicles at the dealership. Other advantages will become apparent from the description provided below. Numerous other modifications or configurations to the dealership energy management system and method thereof will become apparent. While electric vehicles have been primarily described, this disclosure may relate to hybrid vehicles for which a battery and a combustion engine exist.

Figure 1:
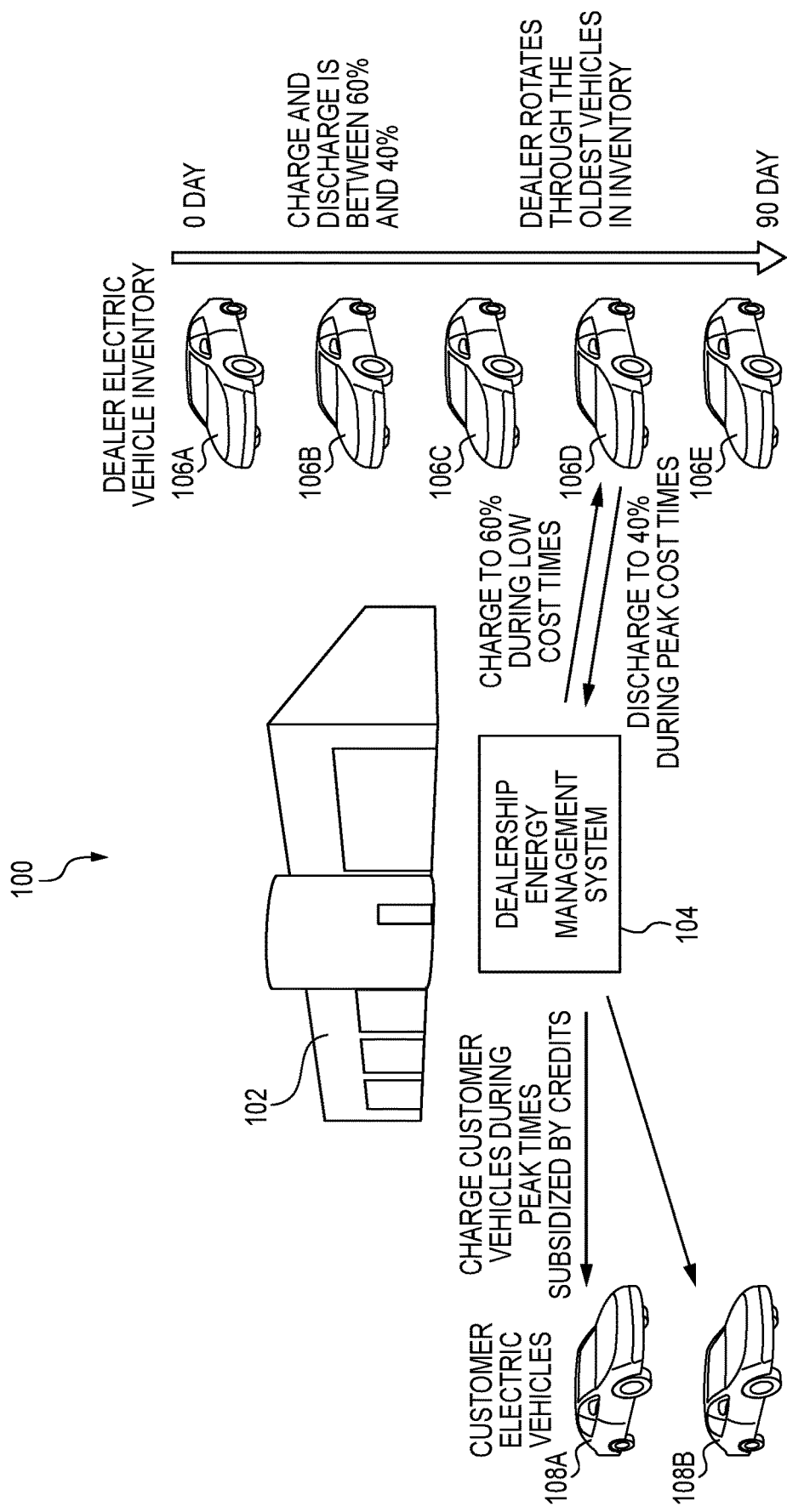
FIG. 1 is a schematic diagram of an illustrative scenario where inventory vehicles within a dealership are used to charge incoming customer electric vehicles in accordance with one aspect of the present disclosure.

FIG. 1 is a schematic diagram of an illustrative scenario 100 where inventory vehicles 106A, 106B, 106C, 106D and 106E (collectively inventory vehicles 106) within a dealership are used to charge incoming customer electric vehicles 108A and 108B (collectively customer vehicles 108) in accordance with one aspect of the present disclosure. The dealership 102 may house and store the inventory vehicles 106. The dealership 102 may also be used as a local distribution that sells, leases, and rents vehicles. These vehicles may include electric, hybrid and internal combustion engine (ICE) vehicles. Typically, these vehicles may be provided based on a dealership contract with the manufacturer. Car salesmen may be employed by the dealership 102 and may also provide maintenance services for the vehicles and employ automotive technicians to stock and sell spare automobile parts and process warranty claims.

The dealership 102 may use and employ the dealership energy management system 104. The system 104 may be local and onsite at the dealership 102, or may be remote therefrom. In one embodiment, the system may employ solar photovoltaic panels at the dealership 102 to generate electrical charge. The dealer energy management system 104 may be used to actively monitor and control overall facility demand charges within the building of the dealership 102. The system 104 may use a network of distributed local devices deployed at the dealership 102, such as wireless thermostats and lighting control relays, in combination with electric vehicle charging control through a native electric vehicle charger interface, to respond to potential peak demand events. The system 104 may automatically shed heating, ventilation, and air conditioning (HVAC), lighting, and electric vehicle charging loads based on dealership priority factors, acting within the utility peak demand interval to manage overall peak demand impacts from electric vehicle charging and other facility demand events. A battery may also be used to provide additional peak demand management in conjunction with the load shedding properties of the dealership energy management server 104.

The architecture of the dealership energy management server 104 may rely on a system-of-systems approach, leveraging distributed HVAC, electric vehicle charging, battery and lighting control devices managed through individual network or cloud-based control systems. A cloud-based demand optimization control system may interact directly with some devices at the dealership, while also interacting with the network or cloud control systems managing the distributed devices. In this way, typical control may be managed and optimized locally through any network, while demand management control may be performed in a supervisory layer that relies on integration of information from multiple systems in real time. The supervisory cloud-based control actions may then be determined without impact to local network resources, and precise actions taken that require limited manipulation of the distributed devices (such as changing the mode of a local thermostat in response to a peak demand event).

The dealership energy management system 104 may interact directly or indirectly with the utility grid to monitor the monetary value of electricity demand in either real time, or based on time of use demand periods defined by a rate or tariff schedule. Signals from the grid may be used to support overall grid management actions, such as by providing demand response for utility grid support, or other grid support services. Direct bidding models may be included to enable aggregation of demand response/demand management activities for single or multiple dealerships, with the intent to reduce overall grid dynamics introduced from EV charging and solar PV integration on utility grid distribution circuits.

The cloud-based control system may rely on inputs from the local devices, including a high resolution, real time energy meter deployed on the main utility supply to the site. The historical peak demand may be tracked by each time-of-use demand period. Additionally, the future peak demand for the utility billing cycle may be forecasted using a combination of actual hourly forecast data and typical meteorological year data. The historical and forecast demands for the current utility billing cycle may be used to set demand targets within each time-of-use demand period, such on off peak, mid peak, on peak, and super on peak periods, for each billing cycle.

Using historical demand data, the demand shed potential from each system type (EV charging, HVAC, and lighting) may be modeled and used to inform the overall demand management actions. This forecasting informs the dispatch of battery systems in conjunction with fast acting responses from HVAC, lighting, and electric vehicle charging systems to ensure demand targets are not exceeded. The forecasting approach may ensure the both short duration domain events (such as DC fast charging and intermittent clouds on solar PV systems) and long duration domain events (such as extreme temperatures that increase HVAC energy use or cloud cover on PV systems) may be mitigated by the control system.

The dealership energy management system 104 may monitor the real-time demand from the local electricity meter. As demand approaches the demand target within any time of use demand period, the system may respond by adjusting the operations of HVAC, lighting, and electric charging systems. The system may monitor the absolute peak demand and rate of change of the demand and adjusts actions slowly or quickly as needed to attain the peak target. Actions may be prioritized based on perceived impact to the dealership operations and customers, such that overall operational impact may be minimized. Low priority actions may include HVAC and lighting setbacks to support areas, warehouse areas, etc. High priority actions may include HVAC and lighting setbacks to showroom areas and EV charging rate throttling for both Level 2 and DC Fast Chargers.

The dealership energy system 104 may monitor the absolute value and rate of change to the demand during demand control events. As demand decreases below the target threshold, the system may respond by releasing the highest priority actions first, then continues to monitor the absolute and rate of change responses to continue to remove additional actions ranked by priority.

The dealership energy management system 104 may also deploy battery systems. The battery systems may be used to determine the dispatch mode of the battery in conjunction with the shedding potential of the HVAC, lighting, and electric vehicle charging systems. Short duration domain events, such as those associated with electric vehicle charging, may be controlled by demand actions from HVAC, lighting and electric vehicle charging throttling, whereas long duration domain events, and forecast peak events associated with weather conditions, may be controlled with battery dispatch, such as to maximize the overall cost effectiveness of the battery.

The battery system may also be used to respond to short duration domain events where the response from HVAC, lighting, and electric vehicle charging control is insufficient to meet the demand target. This is determined based on a combination of the forecast-based operational mode of the battery and real time demand response potential of the load shedding actions to minimize overall current and future demand charges.

The dealership energy management system 104 may also monitor activity for peak and off-peak demand. The system 104, which will now be described, may charge those inventory vehicles 106A-E during off-peak hours. When the inventory vehicles 106 arrive, they may be cycled in-and-out of the dealership 102 with generally the oldest vehicles 106 being sold first. A date may be associated with each of the vehicles 106 such that they do not have to be stored in consecutive spots at the dealership 102. The system 104 may manage and associate parking spots with inventory vehicles 106 and how many days they have been kept in inventory.

In typical dealerships 102, vehicle inventories may run through a 90-day cycle as shown. The dealership energy management system 104 may charge the inventory vehicles 106, or a portion of them, to a predefined state-of-charge threshold. The state-of-charge threshold may be set to a level of 60%. Between 60% and 40%, batteries on the inventory vehicles 106 maximize their potential without being degraded. By cycling in a range between 40-60% state-of-charge, batteries on the inventory vehicles 106 maximize their potential without being degraded. The inventory vehicles 106 may then provide incoming customer vehicles 108 with charge that has been stored within their batteries. The inventory vehicles 106 may be charged during off-peak hours, which may depend on a day, week and season.

In one embodiment, the incoming customer vehicles 108 may be charged based on charging history. For example, if the customer vehicle 108 may only charge up to 80% in the past, this may be a threshold set by the dealership energy management system 104. The current state-of-charge may also be taken into account of when diverting charge from the inventory vehicles 106 to the customer vehicle 108. That is, the customer vehicle 108 may not be charged until the end as the vehicle 108 only requires thirty (30) minutes of charging.

The incoming customer vehicles 108 may also be able to program their own charging criteria when they arrive. This may be performed through a telematics system located within the vehicle 108. Alternatively, this may be performed by a smart device that the driver carries and is associated with the customer vehicle 108. Each system may be in communication with the dealership energy management system 104. Through this system, the driver, or other user, may manipulate time the vehicle 108 may be charged.

The dealership energy management system 104 may also set a state-of-charge minimum threshold for the inventory vehicles 106. For example, this minimum threshold may be 40%. This value may be used to maximize the potential of their batteries and not degrade them. After the state-of-charge falls below this minimum threshold, other vehicles 106 may be asked to provide charge within the inventory. Thus, the dealership energy management system 104 may establish a state-of-charge between 40% and 60% to prevent degradation of the batteries. That is, the state-of-charge may cycle between 40% and 60%.

Beyond keeping the state-of-charge within a particular range, the dealership energy management server 104 may determine which inventory vehicles 106 are used to provide charge to the customer electric vehicles 108. A single inventory vehicle 106 may be used to directly provide charge to a single customer electric vehicle 108. Alternatively, a single inventory vehicle 106 may be used to charge multiple customer electric vehicles 108. Multiple inventory vehicles 106 may also be used to charge a single or multiple customer electric vehicles 108. As shown, various combinations may be implemented and these should not be construed as limiting.

As shown above, the days in which the inventory vehicles 106 have been stored may be a determinative factor for which inventory vehicles 106 are to provide charge. For example, the longer the inventory vehicle 106 has been within inventory, the less likely the system 104 charges the vehicle 106. By diverting charge from the inventory vehicles 106, additional charge is not received from the grid and thus, savings may be created.

In one alternative implementation, the system 104 may charge and discharge vehicles 106 that have been within inventory for a longer period of time. That is, new incoming vehicles 106 may not be charged and discharged between 60% and 40% as often as the older vehicles 106 within the inventory.

Figure 2:
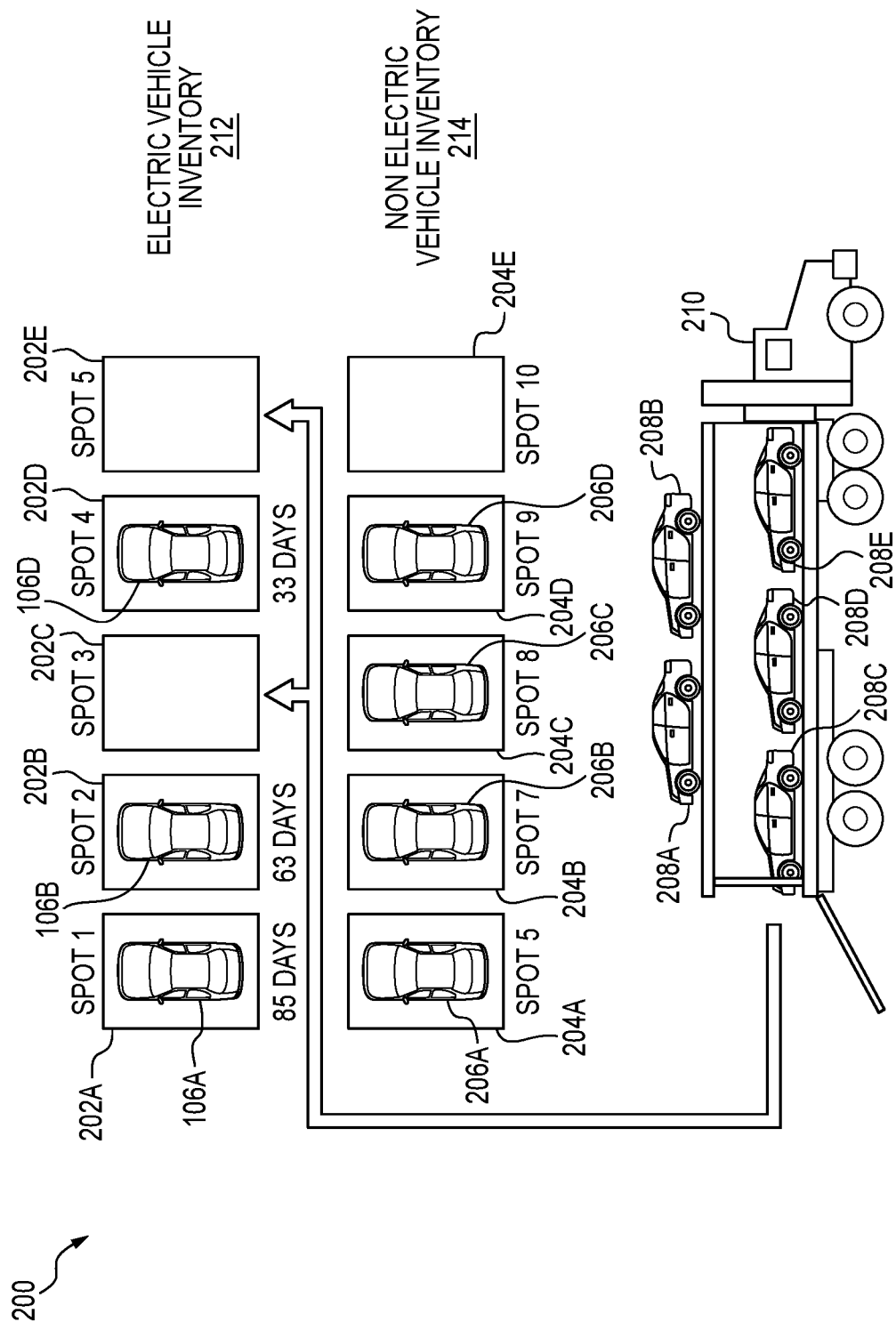
FIG. 2 is a schematic diagram of an illustrative scenario where vehicles are placed into a dealership in accordance with one aspect of the present disclosure.

FIG. 2 is a schematic diagram of an illustrative scenario 200 where vehicles are placed into a dealership in accordance with one aspect of the present disclosure. Maintaining a set of electric vehicles as the inventory vehicles 106 may be used by the dealership energy management system 104. The dealership 102, in the scenario 200, may maintain an electric vehicle inventory 212 and non-electric vehicle inventory 214.

While it is shown that the electric vehicle inventory 212 may store electric vehicles and the non-electric vehicle inventory 214 may store non-electric vehicles, other configurations may exist. For example, ICE vehicles may be stored in the electric vehicle inventory 212 and electric vehicles may be stored in the non-electric vehicle inventory 214. The difference between the electric vehicle inventory 212 and non-electric vehicle inventory 214 may be that the electric vehicle inventory 212 may incorporate hardware for bi-directional charging. Furthermore, while ten (10) spots have been shown, fewer or more may exist at the dealership 102.

Starting with the non-electric vehicle inventory 214, Spot 6 204A, Spot 7 204B, Spot 8 204C, Spot 9 204D and Spot 10 204E may be used for ICE vehicles. In this example, a first ICE vehicle 206A has been parked at Spot 6 204A, a second ICE vehicle 206B has been parked at Spot 7 204B, a third ICE vehicle 206C has been parked at Spot 8 204C and a fourth ICE vehicle 206D has been parked at Spot 9 204D. Spot 10 204E within the non-electric vehicle inventory 214 has not been occupied and a new vehicle may be placed therein.

Inventory vehicles 106A, 106B, and 106D may be currently in place within the electric vehicle inventory 212. Inventory vehicle 106A may be in Spot 1 202A, inventory vehicle 106B may be in Spot 2 202B and inventory vehicle 106D may be in Spot 4 202D. Accordingly, this may leave Spot 3 202C and Spot 5 202E open for new vehicles. While primarily being described as for electric vehicles, plug-in hybrid vehicles may also be placed into these spots to provide charge to the customer electric vehicles 108.

As described above, the dealership energy management system 104 may take into account how many days the inventory vehicles 106 have been at the dealership 102. Inventory vehicle 106A may have been at the dealership 102 for eighty-five (85) days, while inventory vehicle 106B may have sixty-three (63) days, and inventory vehicle 106D may have thirty-three (33) days. When new vehicles are placed into Spot 3 202C and Spot 5 202E, a counter that may be established by the dealership energy management system 104 may start the vehicles at zero (0) days. By doing this, the system 104 may define which vehicles may be charged and discharged first.

As described in another way, "sell priority" may define how inventory vehicles 106 are being sold. Instead of prioritizing vehicles 106 being charged and discharged based on the number of days that have been within inventory, the vehicles 106 may be charged and discharged based on whether the vehicles 106 are sold next. Alternatively, those vehicles 106 that may not be sold next may be charged and discharged first. This may indicate that vehicle 106 may be leaving the dealership 102 soon.

In the scenario 200, a vehicle carrier 210 may provide a number of new vehicles 208A, 208B, 208C, 208D and 208E (collectively new vehicles 208) to the dealership 102. The new vehicles 208 may include different types of vehicles such as electric vehicles, hybrid vehicles and ICE vehicles. With these new vehicles 208, the spots within the electric vehicle inventory 212 and non-electric vehicle inventory 214 may be filled. Typically, the carrier 210 may drop off new vehicles 208 at different dealerships and all of the vehicles 208 may not be unloaded at one location. In the scenario, Spot 3 202C may be filled with inventory vehicle 106C from the new vehicles 208, Spot 5 202E may be filled with inventory vehicle 106E from the new vehicles 208 and Spot 10 204E may be filled from the new vehicles 208.

Figure 3:
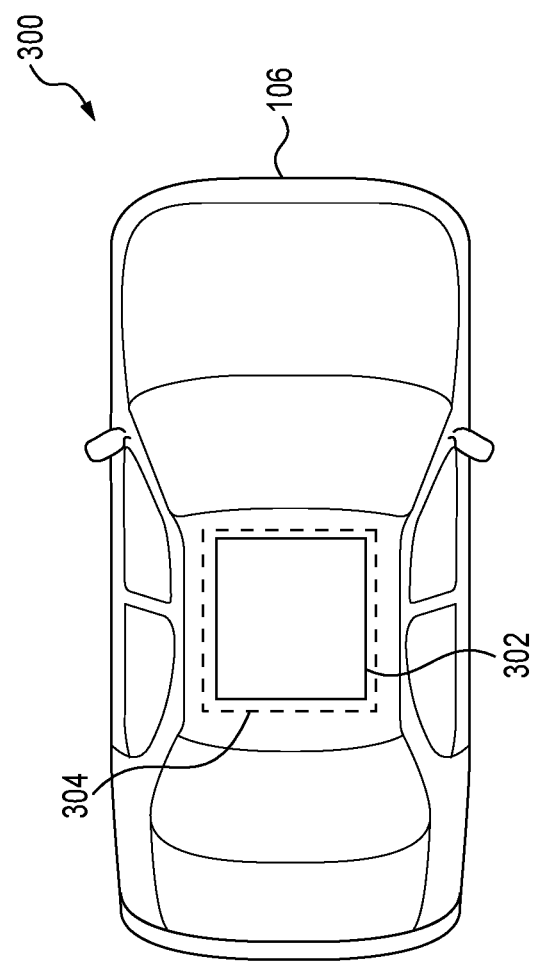
FIG. 3 is a schematic diagram of an illustrative scenario showing a cross sectional top view of an electric vehicle with wireless bi-directional charging capabilities in accordance with one aspect of the present disclosure.

FIG. 3 is a schematic diagram of an illustrative scenario 300 showing a cross sectional top view of an inventory vehicle 106 with wireless bi-directional charging capabilities in accordance with one aspect of the present disclosure. The vehicle 106, when placed into a spot at the dealership 102, may drive over a wireless ground coil 304. The wireless ground coil 304 may provide charge when activated and may also draw charge from the vehicle 106 when allowed by the vehicle 106. Thus, the wireless ground coil 304 may provide wireless charging and drawing capabilities for a vehicle 106.

When the vehicle 106 is driven into the spot, the vehicle coil 302 may be matched to the wireless ground coil 304. The wireless ground coil 304 may be larger than the vehicle coil 302. This may allow the in accurate placement of the vehicle coil 302 and still allow the vehicle 106 to charge or charge be drawn from. In some implementations, the wireless ground coil 304 or the vehicle coil 302 may be automatically positioned such that they are able to draw or charge most effectively. Mechanical/software implementations may be used to align the wireless ground coil 304 and/or the vehicle coil 302.

Figure 4:
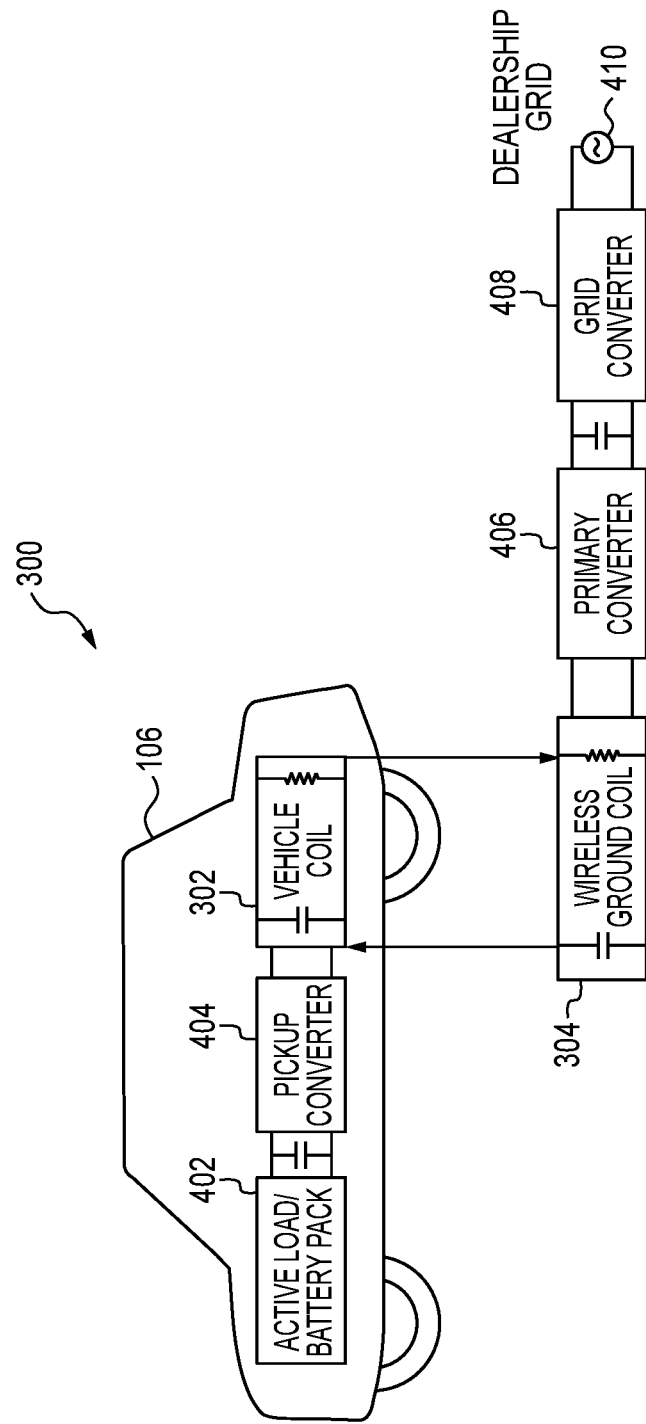
FIG. 4 is a schematic diagram of the illustrative scenario showing a side view of the inventory vehicle with wireless bi-directional charging capabilities in accordance with one aspect of the present disclosure.

FIG. 4 is a schematic diagram of the illustrative scenario 300 showing a side view of the inventory vehicle 106 with wireless bi-directional charging capabilities in accordance with one aspect of the present disclosure. To make bi-directional charging and drawing charge therefrom, the inventory vehicle 106 may include an active load/battery pack 402, pick-up converter 404, and the vehicle coil 302. Other components may exist and are not limited to those shown.

The active load/battery pack 402 may encompass an active load which may power hardware/software on the vehicle 106. For example, pre-cooling the vehicle may be performed using charge received from the pack 402. The pack 402 may also be used to power the vehicle lights. Energy drawn from the pack 402 may be used to drive an electric motor. The pack 402 may also store energy. Typically, the pack 402 is a set of any number of identical batteries or individual battery cells. They may be configured in a series, parallel or a mixture of both to deliver the desired voltage, capacity, or power density.

Connected to the active load/battery pack 402, may be the pick-up converter 404. When energy is received from the wireless ground coil 304 and received by the vehicle coil 302, charge may be converted such that it may be stored into the pack 402. The pick-up converter 404 may prepare the charge by drawing it from the pack 402 and then providing it to the vehicle coil 302.

Within the ground, the wireless ground coil 304 may be present. The wireless ground coil 304 may provide and receive charge from the vehicle coil 302. The wireless ground coil 304 may interact with the primary converter 406. The primary converter 406 is an electric power converter which may change the voltage of an electrical power source. It may be combined with other components to create a power supply. The primary converter 406 may receive and provide charge to the wireless ground coil 304.

Attached to the primary converter 406 may be a grid converter 408. The grid converter 408 may change the voltage from the dealership grid 410 such that the primary converter 406 may use it or receive it. Thus, when power is drawn or sent to the dealership grid 410, the power must be converted by the grid converter 408 and the primary converter 406.

The dealership grid 410 may be the localized grid on the dealership 102 and may be controlled by the dealership energy management system 104. The dealership grid 410 may be tied into the city grid to draw and provide power to. The dealership grid 410 may be a localized grid that receives and provides power to those devices on-site at the dealership 102. Specific hardware may be tied to the dealership grid 410 from the electric vehicle inventory 212, specifically spots 202A, 202B, 202C, 202D and 202E, for example. The same systems may exist for customer electric vehicles 108 who have wireless charging.

Figure 5:
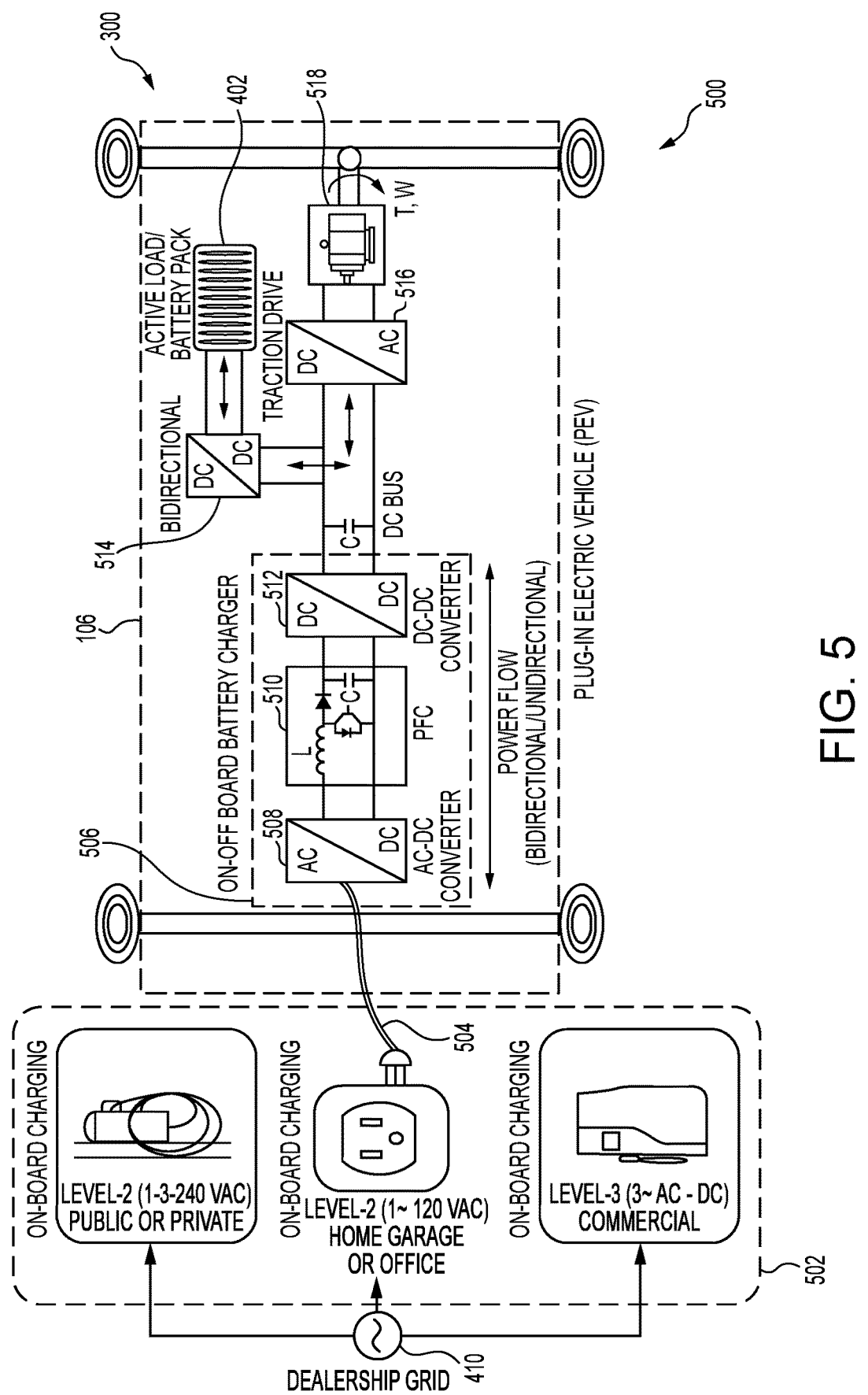
FIG. 5 is a schematic diagram of an illustrative scenario showing a top view of a plug-in inventory vehicle with bi-directional charging capabilities in accordance with one aspect of the present disclosure.

While wireless bi-directional charging may be used, other systems may be implemented by the dealership 102. FIG. 5 is a schematic diagram of an illustrative scenario 500 showing a top view of a plug-in inventory vehicle 106 with bi-directional charging capabilities in accordance with one aspect of the present disclosure. The dealership grid 410 may be tied into the on-board and off-board charging 502. The on-board and off-board charging 502 may include a number of different types of charging stations. For example, a Level-2 public or private charging may be used. The Level 2 charging stations may plug into a 240V outlet and deliver charge to the inventory vehicles 106 to charge it faster. These types of charging stations may be public or private. Generally, one (1) to three (3) stations may be included if they are located in the public.

The on-board and off-board charging 502 may also include Level-1 charging home garage or office stations. These Level-1 stations provide 120V. Generally, the Level-1 Charging stations may be provided through a small outlet. The outlet may be tether to the vehicle 106. In addition, the on-board and off-board charging 502 may include a Level-3 charging station. This station may provide off boarding and may allow bi-directional charging and charging from the dealership grid 410 and the vehicle 106.

A charging connector 504 may connect the on-board and off-board charging 502 to the vehicle 106. The connector 504 may be tied to the on-off board battery charger 506. The charger 506 may provide bi-directional and unidirectional charge flow. That is, charge may be distributed from the vehicle 106 to the on-board and off-board charging 502 and vice-versa.

The on-off board battery charger 506 may include an AC/DC converter 508, power flow controller 510 and DC/DC converter 512. The AC/DC converter 508 may receive AC power from the on-board and off-board charging 502. The converter 508 may convert the AC to DC and vice versa if power is received from the vehicle 106 back to the on-board and off-board charging 502. The power flow controller 510 may control current direction The AC/DC converter 508 may be connected to the power flow controller 510. The power flow controller 510 may provide a switch that allows the vehicle 106 to take on power and provide power to and from the dealership grid 410. Tied to the power flow controller 510 may be a DC/DC converter 512. The DC/DC converter 512 may convert a source of direct current from one voltage level to another.

Continuing with the scenario 500, a bidirectional DC/DC converter 514 may be coupled to the active load/battery pack 402, which was previously described. The use of the bidirectional DC/DC converter 514 may receive and provide power to active load/battery pack 402. The active load/battery pack 402 may be used to store charge as well as provide charge to the motor 518 through the traction drive 516. Typically, and as will be shown, the dealership energy management system 104 may store energy within the inventory vehicles 106 and when needed pull the energy from the active load/battery back 402.

Figure 6:
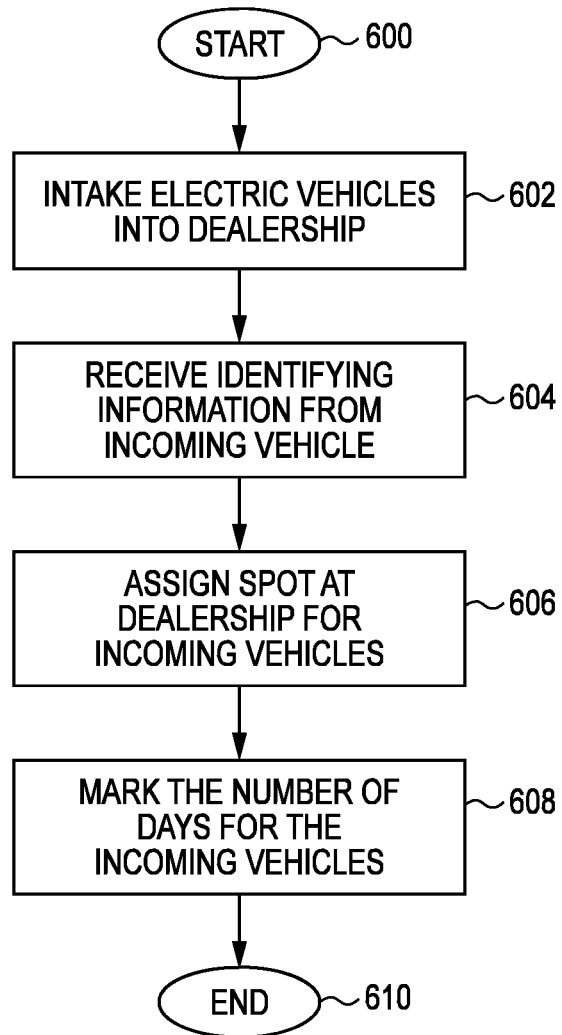
FIG. 6 is a schematic diagram of an illustrative flow chart showing processes for receiving incoming electric vehicles into the dealership in accordance with one aspect of the present disclosure.

Referring to FIG. 6, a schematic diagram of an illustrative flow chart showing processes for receiving incoming electric vehicles into the dealership in accordance with one aspect of the present disclosure is provided. These processes may be used to assign dates to incoming vehicles. The dates may be used to distinguish how to charge and/or discharge the inventory vehicles 106 within the electric vehicle inventory 212. The processes may begin at block 600.

At block 602, the vehicle carrier 210 may provide new vehicles 208. The dealership 102 may begin to intake cars including electric vehicles. Identifying information may be received from the incoming vehicle at block 604. This information may include a vehicle identification number (VIN) of the vehicle. This may be automatically scanned in and or manually performed.

At block 606, the dealership energy management system 104 may assign a spot for the electric vehicle at the dealership 102. Non-electric vehicles may be placed into the non-electric vehicle inventory 214 while electric vehicles may be sent to the electric vehicle inventory 212. The number of days for the incoming vehicles may be marked at block 608. By marking the dates, the vehicles that have been at the dealership 102 the least amount of days may be used more often to provide customer electric vehicles 108 with charge than those with older dates. The processes may end block 610.

Figure 7:
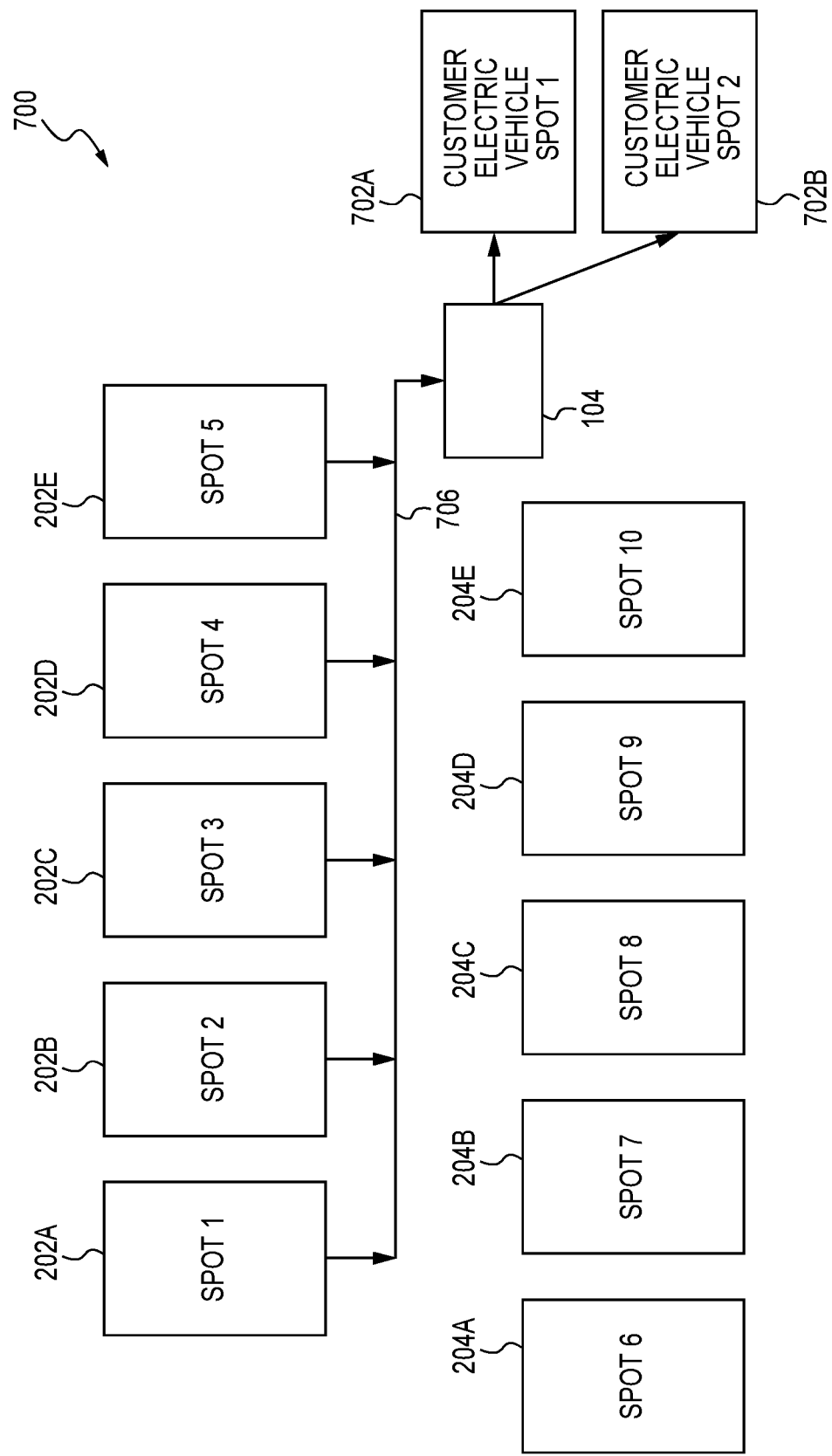
FIG. 7 is a schematic diagram of the illustrative scenario showing the dealership having parking spots for inventory vehicles, non-electric vehicles and customer electric vehicles in accordance with one aspect of the present disclosure.

FIG. 7 is a schematic diagram of the illustrative scenario 700 showing the dealership 102 having parking spots for inventory vehicles 106, non-electric vehicles and customer electric vehicles 108 in accordance with one aspect of the present disclosure. Similar to before, a number of parking spots may be available. Those parking spots associated with the inventory vehicles 106 may include Spot 1 202A, Spot 2 202B, Spot 3 202C, Spot 4 202D and Spot 5 202E. The other spots 204A, 204B, 204C, 204D and 204E may be used for ICE vehicles or may be used for hybrids and electric vehicles.

Spot 1 202A, Spot 2 202B, Spot 3 202C, Spot 4 202D and Spot 5 202E may incorporate hardware as shown above to facilitate bi-directional charging. The inventory vehicles 106 may store and provide energy while they are placed in electric vehicle inventory 212. The line 706 may connect Spot 1 202A, Spot 2 202B, Spot 3 202C, Spot 4 202D and Spot 5 202E to the dealership energy management system 104. Both power and communication lines may be provided within the line 706. Communication lines may provide signals that activate the charging or drawing charge from inventor vehicles 106.

In turn, the dealership energy management system 104 may provide charge to customer electric vehicle Spot 1 702A and customer electric vehicle Spot 2 702B (collectively, customer electric vehicle spots 702). Hardware similar to those previously described may be used in the customer electric vehicle spots 702. However, typically the hardware may be related to only charging the vehicles. These may include the line connections or wireless implementations.

Figure 8:
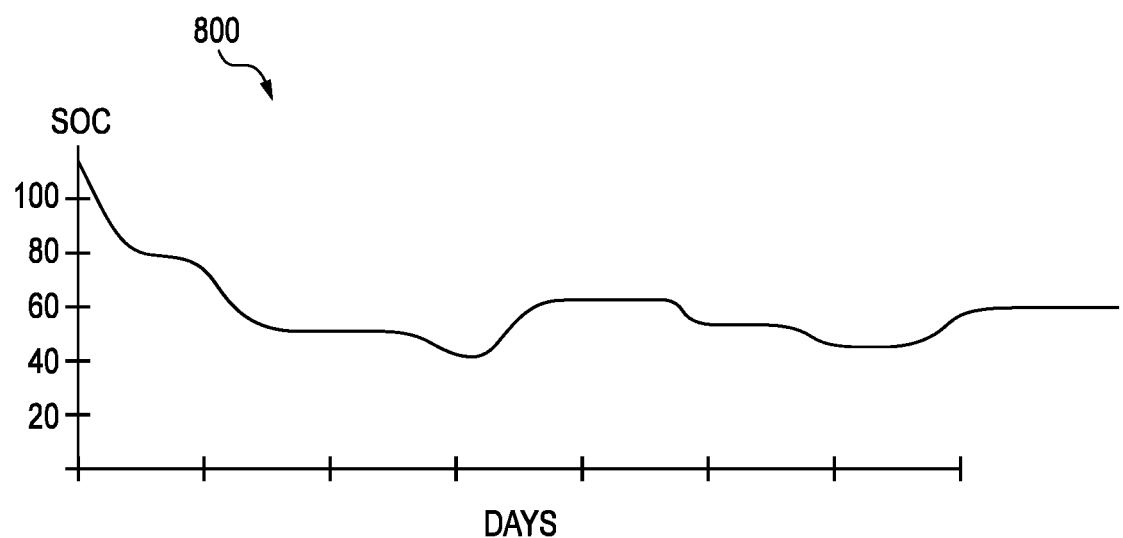
FIG. 8 is a schematic diagram of an illustrative chart showing processes for charging many inventory vehicles and providing charge to the customer electric vehicles in accordance with one aspect of the present disclosure.

Different types of variables and/or parameters may be used to charge the inventory vehicles 106. FIG. 8 is a schematic diagram of an illustrative chart 800 showing processes for charging many inventory vehicles 106 and providing charge to the customer electric vehicles 108 in accordance with one aspect of the present disclosure. In this particular instance, when there are a relatively high number of inventory vehicles 106, then they would be less likely to have fluctuations in charging and drawing of power. Noticeably, the inventory vehicle 106 may come in at near 100% state-of-charge (SOC). In one embodiment, the dealership energy management system 104 may discharge power from the vehicle 106 to provide customer electric vehicles 108 charge right away. The system 104 may continue to discharge the vehicle 106 until it reaches 40% SOC.

As further shown in the chart 800, the SOC may transition between 60% and 40%. The number of transitions between these SOCs may be smaller due to the higher amount of inventory vehicles 106. As the number of days progress, the less likely the inventory vehicle 106 may be used. Near the end, the charge may stay relatively stable due to the number of days it has been placed in inventory 212.

Figure 9:
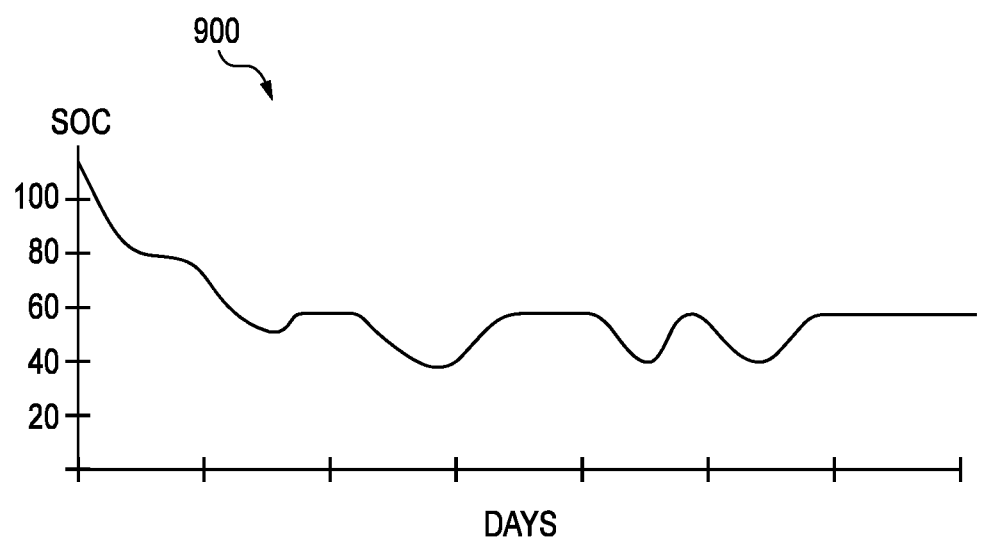
FIG. 9 is a schematic diagram of an illustrative chart showing processes for charging a few inventory vehicles and providing charge to the customer electric vehicles in accordance with one aspect of the present disclosure.

FIG. 9 is a schematic diagram of an illustrative chart 900 showing processes for charging a few inventory vehicles 106 and providing charge to the customer electric vehicles 108 in accordance with one aspect of the present disclosure. The incoming inventory vehicle 106 may come in at a nearly 100% SOC. The SOC may then range between 60% and 40% SOC. This range may cycle many more times than previously shown. The few remaining inventory vehicles 106 may have to provide the charge for the incoming customer vehicles 108.

In one embodiment, the dealership energy management system 104 may not charge the inventory vehicle 106 until it reaches a predefined threshold. For example, the system 104 may charge the inventory vehicle 106 when the SOC reaches below 48%. The inventory vehicle 106, otherwise, may not be charged until reaching this threshold.

The threshold set above may also depend on the number of inventory vehicles 106. For example, if there are a total of five (5) inventory vehicles 106, the dealership energy management system 104 may set the threshold at 45% to begin charging during off-peak times. While the inventory vehicle 106 may discharge to 40%, charging may be set when the vehicle 106 SOC drops below 45%.

Figure 10:
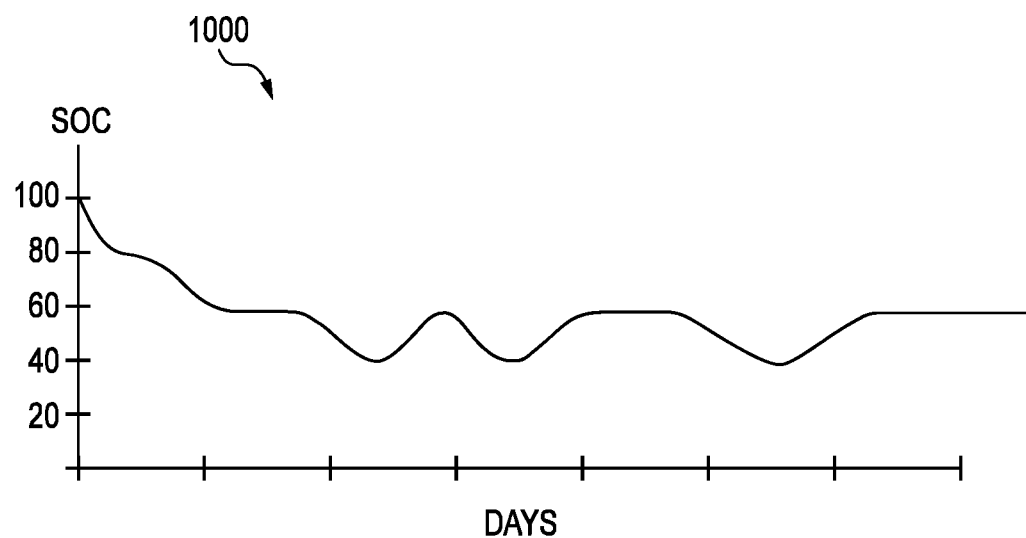
FIG. 10 is a schematic diagram of an illustrative chart showing processes for charging newer inventory vehicles and providing charge to the customer electric vehicles in accordance with one aspect of the present disclosure.

FIG. 10 is a schematic diagram of an illustrative chart 1000 showing processes for charging newer inventory vehicles 106 and providing charge to the customer electric vehicles 108 in accordance with one aspect of the present disclosure. After discharging the inventory vehicle 106 from nearly 100% SOC, the inventory vehicles 106 may be charged and discharged more frequently.

Figure 11:
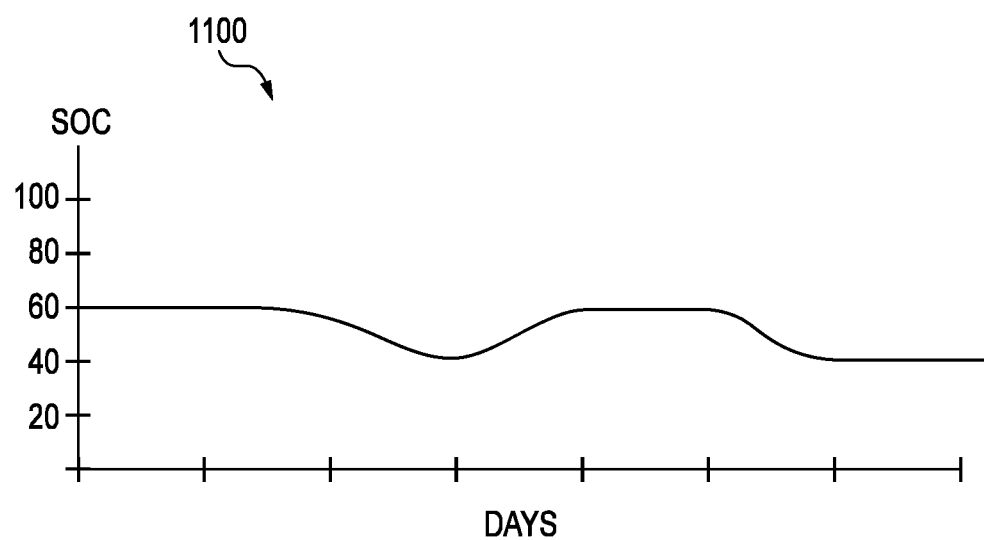
FIG. 11 is a schematic diagram of an illustrative chart showing processes for charging older inventory vehicles and providing charge to the customer electric vehicles in accordance with one aspect of the present disclosure.

FIG. 11 is a schematic diagram of an illustrative chart 1100 showing processes for charging older inventory vehicles 106 and providing charge to the customer electric vehicles 108 in accordance with one aspect of the present disclosure. As compared to newer inventory vehicles 106, the older inventory vehicles 106 may not be charged and discharged as much to prevent degradation of the batteries. In one alternative implementation, older vehicles 106 may be charged and discharged more frequently.

Figure 12:
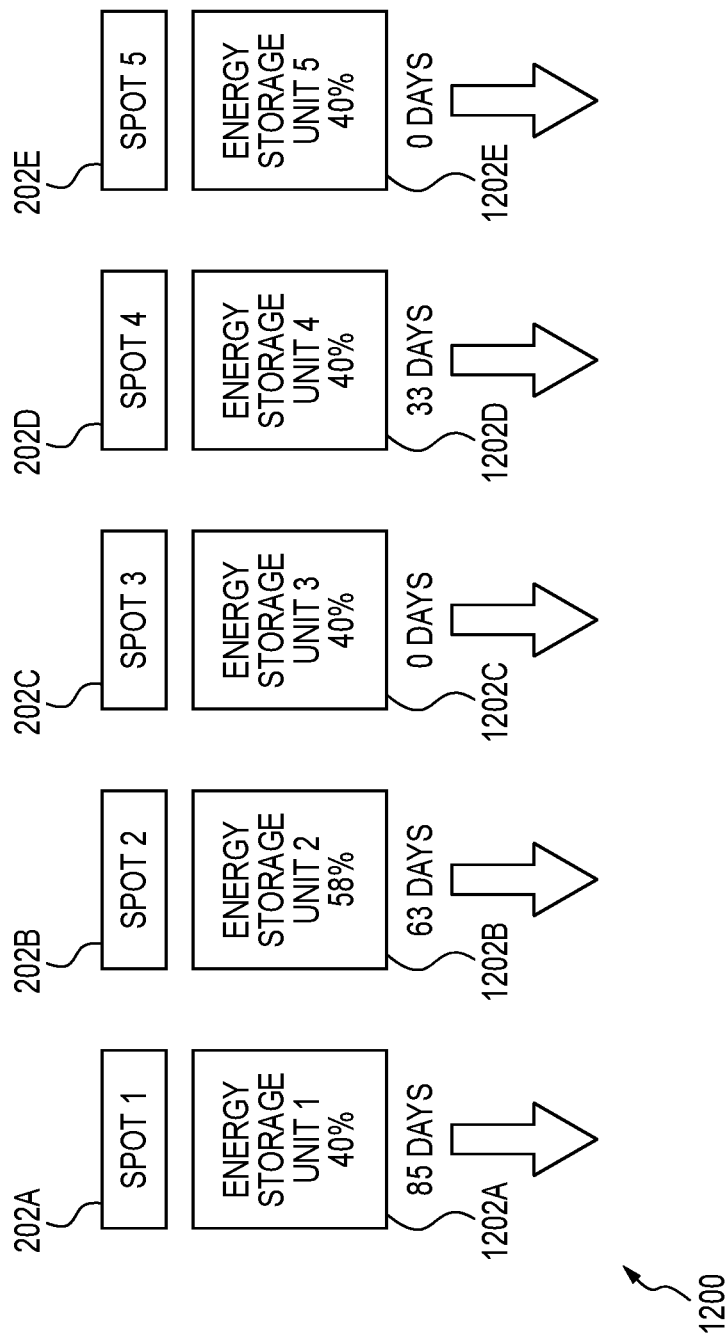
FIG. 12 is a schematic diagram of an illustrative scenario showing prioritizing of charging energy storage units in accordance with one aspect of the present disclosure.

Turning now to FIG. 12, a schematic diagram of an illustrative scenario 1200 showing prioritizing of charging energy storage units 1202A, 1202B, 1202C, 1202D and 1202E (collectively energy storage units 1202) in accordance with one aspect of the present disclosure is provided. The dealership energy management system 104 may begin to charge those vehicles 106 that have been within the inventory 212 the least amount of days. Alternatively, those vehicles 106 having been within inventory 212 the longest may charged and discharged more frequently. Those vehicles would be at Spot 3 202C and Spot 5 202E. The system 104 may then charge the energy storage units 1202 at those spots 202C and 202E first, or one after the other. Typically, the SOC of the inventory vehicles 106 may be charged up to 60%. The energy storage unit 202C and the energy storage unit 202E may be charged first, either simultaneously (in parallel) or one after the other (in series). The energy storage unit 202C and the energy storage unit 202E may each have 40% SOC and thus, have hit the predefined threshold to begin charging during off-peak hours.

The dealership energy management system 104 may charge the energy storage unit 202C and the energy storage unit 202E up to 60% first and then charge the other energy storage units 1202A, 1202B and 1202D. For example, the next energy storage units 1202 to be charged may be based on dates. That is, energy storage unit 1202D may be charged next because it has been in the inventory the next least amount of time, that is, thirty-three (33) days. The energy storage unit 1202D may have also fallen below the predefined threshold such that it would start charging also during off-peak hours.

Following, and if this were based on the days in inventory 212, the dealership energy management system 104, may charge the energy storage unit 1202B next as it has been in inventory 212 for sixty-three (63) days. The energy storage unit 1 1202A may be charged over energy storage unit 1202B even though the energy storage unit 1 1202A has eighty-five (85) days and the energy storage unit 2 1202B has sixty-three (63) days. In this case, the energy storage unit 2 1202B has not reached the threshold of 45% SOC as it has a 50% SOC. The system 104 may bypass energy storage unit 2 1202B for energy storage unit 1 1202A, which has a lower SOC, 40%, and has hit the threshold of less than 45% SOC. If there is time remaining, the system 104 may then charge the energy storage unit 2 1202B up to 60%. Each of the energy storage units 1202 may be charged up to 60% if given enough time.

Figure 13:
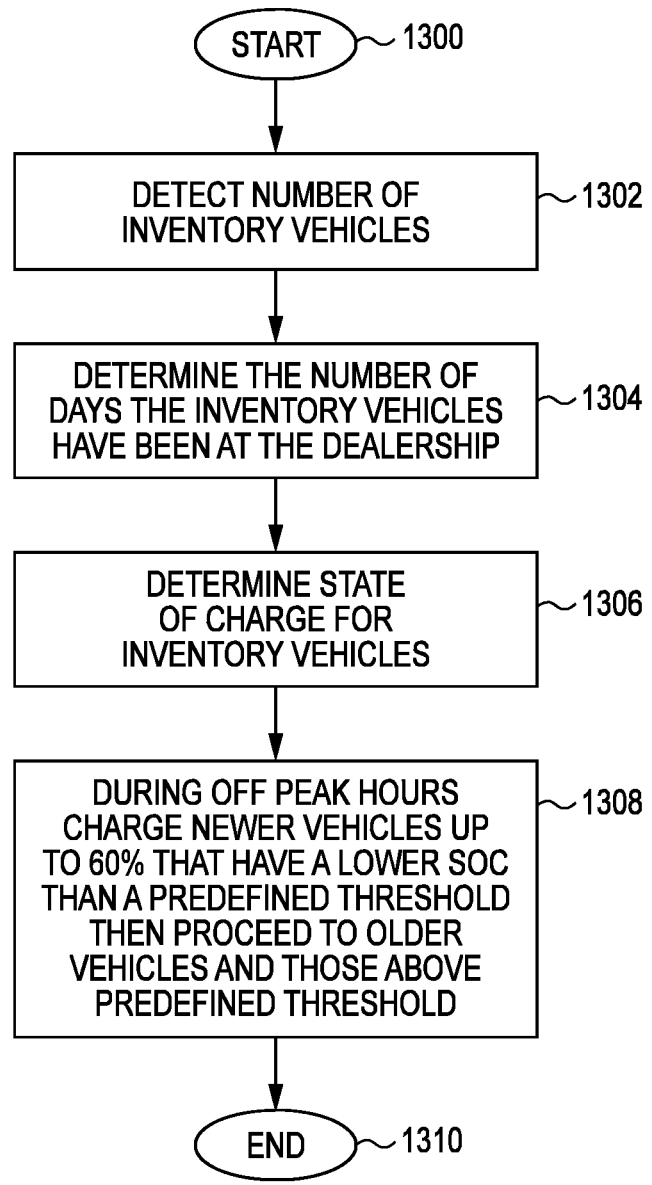
FIG. 13 is a schematic diagram of an illustrative flow chart showing processes for charging inventory vehicles at the dealership in accordance with one aspect of the present disclosure.

FIG. 13 is a schematic diagram of an illustrative flow chart showing processes for charging inventory vehicles 106 at the dealership 102 in accordance with one aspect of the present disclosure. The processes may begin at block 1300. The processes are for illustrative purposes and should not be construed as limiting. Further, the ordering of the processes may be changed where applicable.

At block 1302, the dealership energy management system 104 may detect the number of inventory vehicles 106 within the inventory 212. The dealership energy management system 104, at block 1304, may determine the number of days the inventory vehicles 106 have been at the dealership 102. This may be used to determine which inventory vehicles 106 are charged first.

At block 1306, the SOC for the inventory vehicles 106 is determined. In some instances, this may be used to determine whether the vehicle 106 is to be charged. When the vehicle 106 has not reached below the threshold, the vehicle 106 may be charged later and passed for those vehicles 106 that are below a threshold.

At block 1308, during off-peak hours, the dealership energy management system 104 may charge new vehicles up to 60% that have a lower SOC than a predefined threshold, then proceed to older vehicles. Each may be charged up to 60% if below a threshold and then any remaining time afterwards may allow those above the threshold to charge. The processes may end at block 1310.

Figure 14:
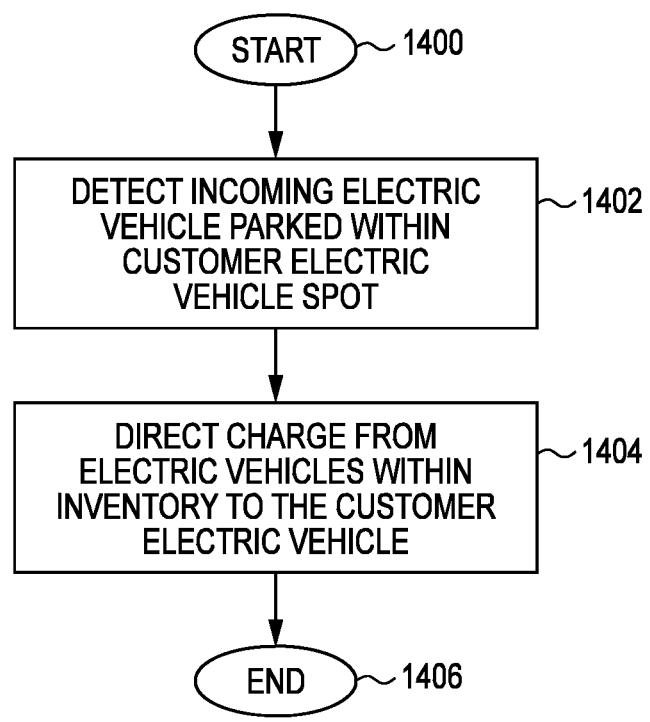
FIG. 14 is a schematic diagram of an illustrative flow chart showing processes for providing charge to customer electric vehicles at the dealership in accordance with one aspect of the present disclosure.

FIG. 14 is a schematic diagram of an illustrative flow chart showing processes for providing charge to customer electric vehicles 108 at the dealership 102 in accordance with one aspect of the present disclosure. The processes may begin at block 1400. At block 1402, the dealership energy management system 104 may detect an incoming customer electric vehicle 108 parked within a customer electric vehicle spot 702.

Charge from the inventory vehicles 106, at block 1404, may be redirected to the customer electric vehicle 108. The charge may be directed from a portion or all of the inventory vehicles 106. Newer inventory vehicles 106 that have charge above 40% SOC may be used. The processes may end at block 1406.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A dealership energy management system comprising:
   at least one bi-directional charging device associated with inventory vehicles;
   at least one output device associated with customer vehicles;
   at least one processor; and
   a memory operatively coupled to the processor, the memory storing program instructions that when executed by the processor, causes the processor to:
      charge at least one inventory vehicle through the at least one bi-directional charging device during off-peak hours;
      determine whether at least one customer vehicle is connected to the at least one output device;
      provide charge from the at least one inventory vehicle through the at least one bi-directional charging device to the at least one customer vehicle when the at least one customer vehicle is connected to the at least one output device;
      wherein charging the at least one inventory vehicle through the at least one bi-directional charging device during off-peak hours comprises charging the at least one inventory vehicle up to 60% or wherein providing the charge from the at least one inventory vehicle through the at least one bi-directional charging device to the at least one customer vehicle through the at least one output device comprises depleting the at least one inventory vehicle down to 40% before retrieving charge from another inventory vehicle.

2. The dealership energy management system of claim 1, wherein the memory storing program instructions, when executed by the processor, causes the processor to receive days within inventory of the at least one inventory vehicle.

3. The dealership energy management system of claim 2, wherein charging the at least one inventory vehicle through the at least one bi-directional charging device during off-peak hours comprises providing charge to new vehicles first based on the days within inventory.

4. The dealership energy management system of claim 1, wherein the at least one bi-directional charging device and the at least one output device are wireless devices.

5. The dealership energy management system of claim 1, wherein the at least one bi-directional charging device and the at least one output device are line connected devices.

6. The dealership energy system of claim 1, wherein off-peak hours are based on a day, week and season.

7. A method of charging incoming customer vehicles at a dealership with inventory vehicles, the method comprising:
   receiving inventory vehicles;
   charging the inventory vehicles at the dealership during off-peak hours;
   determining whether at least one customer vehicle is connected;
   providing charge from the inventory vehicles to the at least one customer vehicle when connected;
   wherein charging the inventory vehicles and providing charge from the inventory vehicles comprises setting a threshold for the inventory vehicles at a state-of-charge between 40% and 60%.

8. The method of charging incoming customer vehicles at the dealership with inventory vehicles of claim 7, comprising associating a date with the inventory vehicles for charging the inventory vehicles.

9. The method of charging incoming customer vehicles at the dealership with inventory vehicles of claim 8, wherein receiving the inventory vehicles comprises associating the inventory vehicles with a parking spot and associating the vehicles' date of arrival with the parking spot.

10. The method of charging incoming customer vehicles at the dealership with inventory vehicles of claim 9, wherein charging the inventory vehicles at the dealership during off-peak hours comprises providing charge to vehicles having newer dates.

11. The method of charging incoming customer vehicles at the dealership with inventory vehicles of claim 7, wherein providing the charge from the inventory vehicles to the at least one customer vehicle is during peak hours.

12. A dealership energy management system comprising:
at least one bi-directional charging device associated with at least one inventory vehicle;
at least one output device associated with at least one customer vehicle; and
a server charging the at least one inventory vehicle through the at least one bi-directional charging device during off-peak hours and providing the charge from the at least one inventory vehicle through the at least one bi-directional charging device to the at least one customer vehicle when the at least one customer vehicle is connected to the at least one output device;
wherein charging the at least one inventory vehicle and providing the charge from the at least one inventory vehicle comprises setting a threshold for the at least one inventory vehicle at a state-of-charge between 40% and 60%.

13. The dealership energy management system of claim 12, wherein off-peak hours depend on a day, week and season.

14. The dealership energy management system of claim 12, wherein charging the at least one inventory vehicle through the at least one bi-directional charging device during off-peak hours comprises providing charge to older vehicles first.

15. The dealership energy management system of claim 12, wherein the at least one bi-directional charging device and the at least one output device are wireless devices.

16. The dealership energy management system of claim 12, wherein the at least one bi-directional charging device and the at least one output device are line connected devices.

\* \* \* \* \*